March 5, 1935.

G. J. BARRETT ET AL

Re. 19,483

CORE TAKING APPARATUS

Original Filed Jan. 14, 1929 2 Sheets-Sheet 1

Inventors

Southene Robichaux
George J. Barrett

By Hardway & Lathey
Attorneys

March 5, 1935. G. J. BARRETT ET AL Re. 19,483

CORE TAKING APPARATUS

Original Filed Jan. 14, 1929 2 Sheets-Sheet 2

Inventors
Southene Robichaux
George J. Barrett

By Hardway Mathey
Attorneys

Reissued Mar. 5, 1935

Re. 19,483

UNITED STATES PATENT OFFICE 19,483

CORE TAKING APPARATUS

George J. Barrett and Sosthene Robichaux, Houston, Tex., assignors to Reed Roller Bit Company, Houston, Tex., a corporation of Texas Original No. 1,847,424, dated March 1, 1932, Serial No. 332,536, January 14, 1929. Application for reissue October 5, 1934, Serial No. 747,109

10 Claims. (Cl. 255—72)

This invention relates to new and useful improvements in a core taking apparatus.

One object of the invention is to provide an apparatus of the character described that may be readily assembled with a drilling tool and whereby a core of the strata being pierced may be readily formed and withdrawn to the surface for inspection.

Another object of the invention is to provide a device of the character described whereby the core, as formed, may be preserved intact and uncontaminated and withdrawn independent of the drill stem to which the drill it attached.

A further feature of the invention resides in the provision of novel means whereby the core forming apparatus may be locked to rotate with the drill stem and released to permit its withdrawal independent of the stem.

A still further feature of the invention is to provide, in apparatus of the character described, a core barrel which is yieldingly mounted in the drill stem so that when the core forming bit encounters hard strata the barrel and core bit will yield to relieve the stress and prevent breakage of the barrel or core bit.

With the above and other objects in view the invention has particular relation to certain novel features of construction, operation and arrangement of parts an example of which is given in this specification and illustrated in the accompanying drawings, wherein:—

Figure 2:
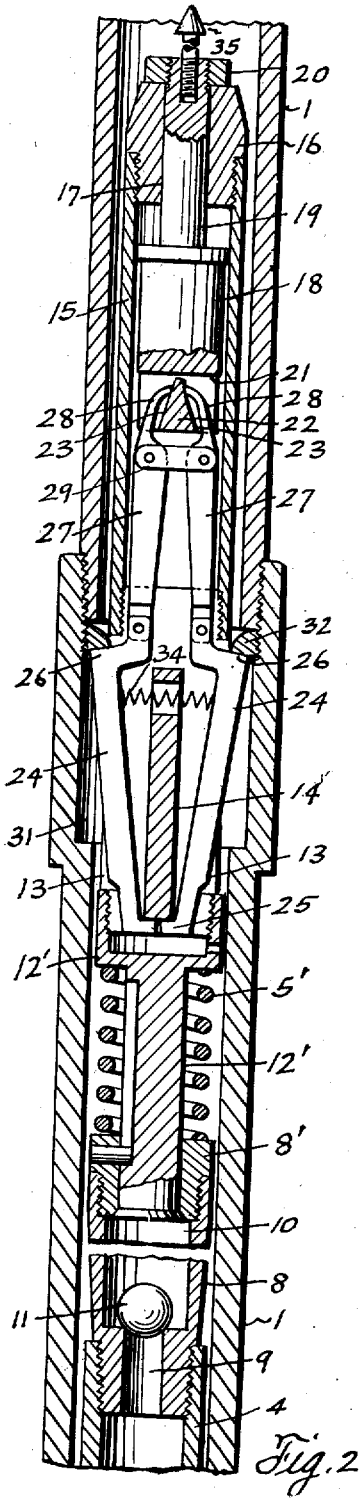
Figure 2 shows a vertical sectional view of the upper end of the core taking device, assembled with the drill stem.

Referring now particularly to the drawings, wherein like numerals of reference designate similar parts in each of the figures, the numeral 1 designates a drill stem, and a drill bit 2 is attached to the lower end of said stem, having an axial bore 3. There is a core barrel comprising the upper and lower sections 4 and 5. The lower end of the core barrel is fitted through the bore 3 and the core forming bit 6 is attached thereto, and preferably extends beneath the bit 2. The barrel section 5 has an annular rib 7 therearound which serves to center it in the stem 1 and the sections 4 and 5 are preferably connected by threads in the conventional manner. Threaded into the upper end of the barrel there is a valve casing 8 having an axial channel 9 therethrough whose upper end is enlarged forming a valve chamber 10 in which the ball valve 11 is located, said valve closing the channel 9 to the passage of fluid downwardly, said valve lifting, however, to permit the upward passage of fluid. Threaded into the upper end of the valve casing 8 there is a bearing member 8′ and working through this bearing member there is a stem 12′ which is splined in said gland for lengthwise but non-rotative movement, and attached to the upper end of which there is cylindrical anchor 12 having opposing vertical slots 13, 13 therein with the intervening web 14 between said slots. The lower end of this stem 12′ forms a stop limiting the upward movement of the valve 11, surrounding the stem 12′ and interposed between the enlarged upper end thereof and the gland 8′ there is a strong coil spring 5′ which serves as a shock absorber for the core barrel and which permits said barrel to yield upwardly.

There is a tubular housing 15 whose lower end is threaded onto said anchor and screwed into the upper end of said housing there is a bearing member 16 having an axial bearing 17. Fitted into the housing 15 there is a release head 18 having a stem 19 which works through the bearing 17 and attached to the upper end of said stem there is a nut 20 adapted to engage the housing. The head 18 and nut 20 are spaced apart a sufficient distance to permit a limited movement of said head in the housing.

Figure 1:
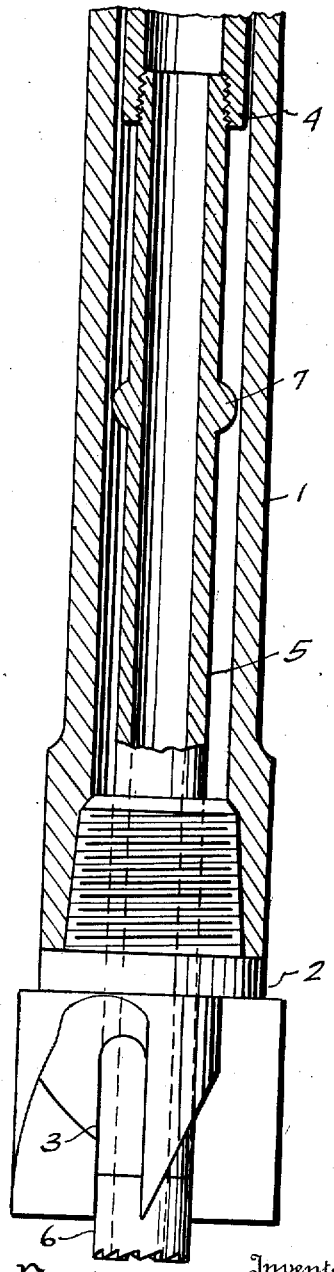
Figure 1 shows a side elevation, partly in section, of the drill and drill stem with the core taking device therein.

The lower end of said head has the opposing disposed upwardly converging notches 21, 21 forming between them a release wedge 22, whose opposite sides have upwardly converging faces 23, 23. Oppositely disposed levers 24, 24 are provided whose lower ends 25, 25, are inwardly turned and engage under the web 14. These levers embrace said web and their upper ends are inwardly offset forming external shoulders, 26, 26. Releasing arms 27, 27 are provided whose upper ends are inwardly turned forming the releasing fingers 28, 28 whose free ends ride upon the corresponding faces 23, 23 and beneath said fingers the arms 27 are connected by the cross links 29 whose ends are pivotally connected to said arms 27. The lower ends of said arms 27 are pivoted to the upper ends of the respective levers 24. A section of the drill stem, as 31, is enlarged and threaded into the upper end of said enlarged section there is an anchor ring 32 whose upper side converges downwardly and depending from this ring there is an abutment 33. Interposed between the upper ends of the levers 24 and extending through an opening in the web 14 is a coil push spring 34. When it is desired to take a core the device is assembled as shown in Figures 1 and 2 and let down through the drill stem and it will be carried downwardly by gravity, until the lower end of the housing 15 engages the ring 32. The rib 7 will hold the open barrel centered relative to the bit 2 so that the lower end of said barrel will enter the bore 3. The head 18 will be held by gravity in its lower position and when the shoulders 26 pass beneath the ring 32 the spring 34 will force the levers 24 outwardly causing the shoulders 26 to engage under said ring 32. The core barrel will thereby be secured in the drill stem. As the stem is now rotated to proceed with the drilling operations, the abutment 33 will engage one of the levers 24 and this will force the barrel to rotate with said stem 1 and as drilling proceeds, a core will be formed which will pass into said core barrel. As the barrel is filled with the core any fluid that may be therein above the core will be forced out through the channel 9, the valve 11 lifting to permit this. In case the core forming bit 6 encounters a hard stratum the spring 5' will permit the barrel and core bit to yield upwardly and injury or breakage of the said barrel or core bit will thus be avoided.

Figure 6:
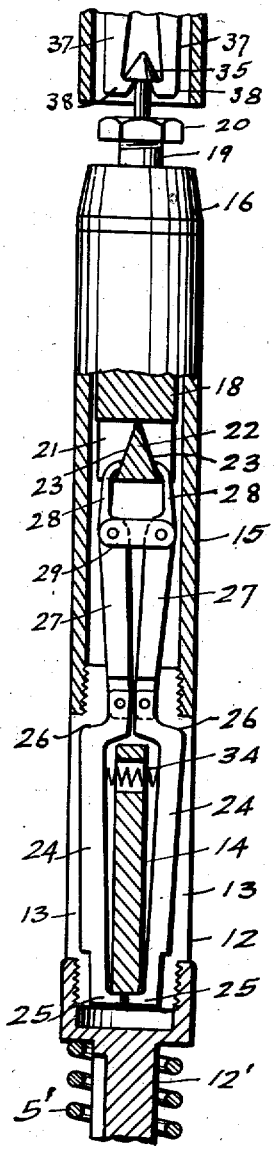
Figure 6 shows a side elevation of the upper end of the core taking apparatus, partly in section and shown in released position.
Figure 5:
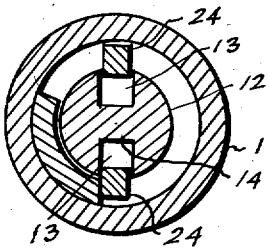
Figure 5 shows a cross sectional view thereof taken on the line 5—5 of Figure 4.
Figure 4:
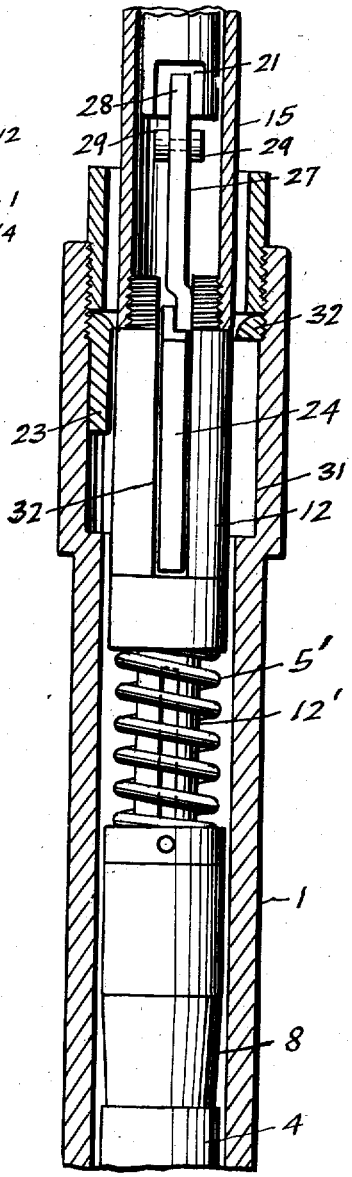
Figure 4 shows a fragmentary view of an intermediate section of the core taking device assembled with the drill stem.

Upstanding from the upper end of the stem 19 there is a conical shaped head 35. When the core is completed, a fishing tool may be let down through the drill stem and engaged with said head 35. An upward pull on said fishing tool will first cause the head 18 to move upwardly in the housing 15 and this in turn will cause the wedge 22 to spread the fingers 28. The lower ends of the arms 27 will thereby be moved inwardly releasing the shoulders 26 from the ring 32 as shown in Figure 6.

Meanwhile the head 18 will have engaged the lower end of the bearing member 16 and the entire device may be thereupon withdrawn from the drill stem by said fishing tool. During the withdrawal operation the valve 11 will effectively close the channel 9 and the core will thus be held against dropping out of the barrel 5.

Figure 3:
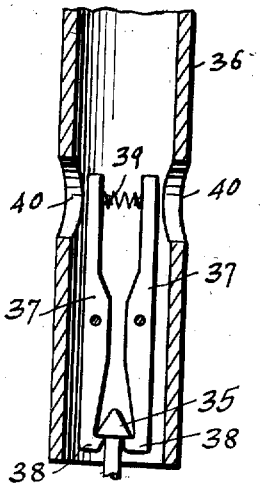
Figure 3 shows a fragmentary vertical sectional view of a fishing tool employed.

Any conventional type of fishing tool may be employed. A preferred type is shown in Figure 3 and includes a tubular body 36, having oppositely disposed dogs 37, 37 pivotally mounted therein. The lower ends 38, 38 of these dogs are inwardly turned and thus adapted to engage under the head 35 and between the upper ends of said dogs, there is a push spring 39 adapted to hold the dogs in such engagement. The fishing tool may be let down through a suitable cable, (not shown) and the head 35 will enter between the lower ends of the dogs and spread them and pass above said inwardly turned ends 38 which will thereupon engage under said head. When the core taking device has been withdrawn the dogs 37 may be released from the head 35 by pressing their upper ends inwardly and oppositely disposed openings 40, 40 have been provided in the body 36 for access to said upper ends for the purpose indicated.

While we have shown what we now consider to be the preferred form of the invention, it is obvious that mechanical changes may be made therein and equivalents substituted for the parts shown and we reserve the right to make such mechanical changes and substitutions as may be found desirable within the scope of the appended claims.

Lowering a barrel into place by means of a cable is obviously time-consuming and expensive in modern wells which are often more than a mile deep. Such lowering is rendered unnecessary by this invention.

It will be understood that the fishing tool shown by Fig. 3 is adapted for use only in withdrawing the barrel upwardly thru the stem. It is not used to lower the barrel into place. The barrel is simply inserted in the drill stem at the surface of the earth and let loose, and descends by gravity into its core-receiving position. During such descent the levers 24 will not become caught on any internal shoulders or the like in the drill stem because the levers 24 are free to move inwardly against the resistance of spring 34 when such shoulders or the like are encountered. Therefore, the barrel will drop from the surface of the earth downwardly in the drill stem to the bottom of the drill stem, whereupon the spring 34 will automatically move the levers 24 under the ring 32, whereby the barrel is held in its core-receiving position.

As is obvious from Fig. 2 showing the relative size of parts 26 and the internal diameter of drill stem 1, as the barrel is lowered by gravity the spring 34 will press parts 26 lightly against the interior walls of the drill stem 1 and prevent the development of excessive speed of falling by a slight braking action. Obviously this braking action may be supplemented by the existing conditions if the drill stem and well be full of water or drilling mud, as obviously is contemplated, and obviously this braking action may be counteracted by a downward circulation of fluid through the drill stem as is obviously contemplated in the description of ball valve 11. In this manner spring 34 permits the core barrel to be eased into place without the use of a cable.

What we claim is:

1. The combination with a hollow drill stem and a drilling tool attached to the lower end thereof and having an axial bearing, of a core barrel in the stem whose lower end works through said bearing, said core barrel, when let loose substantially at the upper end of said drill stem, being movable by gravity downwardly in said drill stem into its core-receiving position, a core former at the lower end of the barrel, means for holding the core former yieldingly against the formation, a ring in the stem having a depending abutment, and releasable means carried by the barrel and engageable underneath said ring and against said abutment, when said core barrel reaches its core-receiving position.

2. The combination with a hollow drill stem and a drilling tool attached to the lower end thereof and having an axial bearing, of a core barrel in the stem whose lower end works through said bearing, said core barrel, when let loose substantially at the upper end of said drill stem, being movable by gravity downwardly in said drill stem into its core-receiving position, a core former at the lower end of the barrel, means holding the core former yieldingly against the formation being pierced, a ring in the stem having a depending abutment, releasable means carried by the barrel and engageable underneat said ring and against said abutment when said core barrel reaches its core-receiving position, and a yieldable member normally holding said means in such engagement.

3. The combination with a hollow drill stem and a drilling tool attached to the lower end thereof and having an axial bearing, of a yieldingly mounted core barrel in the stem whose lower end works through said bearing, said core barrel, when let loose substantially at the upper end of said drill stem, being movable by gravity downwardly in said drill stem into its core-receiving position, a core former at the lower end of the barrel, and working yieldingly against the formation, a ring in the stem having a depending abutment, releasable means carried by the barrel and engageable underneath said ring and against said abutment when said core barrel reaches its core-receiving position, a yieldable member normally holding said means in such engagement, and a releasing device operatively connected with said means and adapted to release the same upon upward movement of said device.

4. The combination with a hollow drill stem and a drilling tool attached to the lower end thereof and having an axial bearing, of a core barrel in the stem whose lower end works through said bearing, said core barrel, when let loose substantially at the upper end of said drill stem, being movable by gravity downwardly in said drill stem into its core-receiving position, a core former at the lower end of the barrel, yieldable means adapted to hold the core former against the formation being pierced, a ring in the stem having a depending abutment, releasable means carried by the barrel and engageable underneath said ring and against said abutment when said core barrel reaches its core-receiving position, a yieldable member normally holding said means in such engagement, a releasing device operatively connected with said means and adapted to release the same upon upward movement of said device, and means attached to said barrel with which the releasing device is adapted to engage, upon upward movement thereof, to effect the withdrawal of said barrel from the stem.

5. The combination with a hollow drill stem and a drilling tool attached to the lower end thereof and having an axial bearing, of a yieldably mounted core barrel in the stem whose lower end is associated with said bearing, said core barrel, when let loose substantially at the upper end of said drill stem, being movable by gravity downwardly in said drill stem into its core-receiving position, a core forming tool beneath the lower end of the stem, an inwardly extending abutment in the stem, releasable means connected to the barrel and engageable underneath said abutment when said core barrel reaches its core-receiving position, means normally maintaining such engagement, means in the stem with which said releasable means is adapted to engage to prevent the independent rotation of said barrel relative to the stem, and releasing mechanism connected to said releasable means and operatable to effect the release thereof.

6. The combination with a hollow drill stem and a drilling tool attached to the lower end thereof and having an axial bearing, of a core barrel in the stem whose lower end is associated with said bearing, said core barrel, when let loose substantially at the upper end of said drill stem, being movable by gravity downwardly in said drill stem into its core-receiving position, a core forming tool beneath the lower end of the stem, means effective to hold the core former yieldingly against the formation being cored, an inwardly extending abutment in the stem, releasable means connected to the barrel and engageable underneath said abutment when said core barrel reaches its core-receiving position, means normally maintaining such engagement, means in the stem with which said releasable means is adapted to engage to prevent the independent rotation of said barrel relative to the stem, releasing mechanism connected to said releasable means and operatable to effect the release thereof, said mechanism being also operatively connected to said barrel and forming means to withdraw said barrel from said stem.

7. The combination with a hollow drill stem and a drilling tool attached to the lower end thereof and having a vertical opening, of a core barrel in the stem associated with said opening, said core barrel, when let loose substantially at the upper end of said drill stem, being movable by gravity downwardly in said drill stem into its core-receiving position, a core former at the lower end of the barrel, driving means between the stem and barrel whereby the barrel may be driven from the stem when said core barrel reaches its core-receiving position, said driving means being formed to permit the barrel to move longitudinally relative to the stem and to maintain such driving relation during such movement and yieldable means normally resisting such movement.

8. The combination with a hollow drill stem and a drilling tool at the lower end of the stem having an opening, of a core barrel in the stem whose lower end is associated with said opening, said core barrel, when let loose substantially at the upper end of said drill stem, being movable by gravity downwardly in said drill stem into its core-receiving position, a core former at the lower end of the barrel, driving means whereby the barrel may be driven from the stem when said core barrel reaches its core-receiving position, said driving means including interconnected relatively movable parts shaped to establish such driving relation and yieldable means incorporated into said driving means whereby the core former is held yieldingly against the formation being pierced.

9. The combination with a hollow drill stem and a drilling tool attached to the lower end thereof and having an axial bearing, of a core barrel in the stem whose lower end works through said bearing, a core former at the lower end of the barrel, means holding the core former yieldingly against the formation being pierced, a ring in the stem having a depending abutment, releasable means carried by the barrel and engageable underneath said ring and against said abutment, and a yieldable member normally holding said means in such engagement when said core barrel is in its core-receiving position, said releasable means being movable by said drill stem into its inactive position against the resistance of said yieldable member when said core barrel is let loose substantially at the upper end of said drill stem and permitted to descend by gravity in said drill stem into its core-receiving position.

10. The combination with a hollow drill stem and a drilling tool attached to the lower end thereof and having a vertical opening, of a core barrel in the stem associated with said opening, a core former at the lower end of the barrel, driving means between the stem and barrel whereby the barrel may be driven from the stem when said core barrel is in its core-receiving position, said driving means being formed to permit the barrel to then move longitudinally a limited distance relative to the stem and to maintain such driving relation during such movement, and yieldable means normally resisting such movement, said driving means including core barrel and drill stem elements, said core barrel element being movable into its inactive position by said drill stem when said core barrel is let loose substantially at the upper end of said drill stem and permitted to descend by gravity in said drill stem into its core-receiving position.

GEORGE J. BARRETT.
SOSTHENE ROBICHAUX.